(12) United States Patent
Nelson et al.

(10) Patent No.: US 11,867,211 B1
(45) Date of Patent: Jan. 9, 2024

(54) REMOVABLE PLUGS FOR FURNITURE, SYSTEMS INCLUDING SUCH PLUGS, AND METHODS OF THEIR USE

(71) Applicants: Justin Nelson, Bend, OR (US); Alex Collins, Bend, OR (US)

(72) Inventors: Justin Nelson, Bend, OR (US); Alex Collins, Bend, OR (US)

( * ) Notice: Subject to any disclaimer, the term of this patent is extended or adjusted under 35 U.S.C. 154(b) by 0 days.

(21) Appl. No.: 18/195,812

(22) Filed: May 10, 2023

(51) Int. Cl.
*F16B 13/04* (2006.01)
*F16B 13/12* (2006.01)

(52) U.S. Cl.
CPC .................................. *F16B 13/124* (2013.01)

(58) Field of Classification Search
CPC ............. F16B 55/1141; F16B 12/2054; F16B 13/124; F16L 55/1108; B65D 39/12
USPC .......................................................... 411/15
See application file for complete search history.

(56) References Cited

U.S. PATENT DOCUMENTS

| | | | | |
|---|---|---|---|---|
| 2,079,628 A * | 5/1937 | Olson | ..................... | E05B 29/00 70/358 |
| 2,092,572 A * | 9/1937 | Everett | ................... | F16K 35/06 70/168 |
| 3,618,809 A * | 11/1971 | Martino | ................. | B65D 39/12 220/235 |
| 4,658,861 A * | 4/1987 | Roberson, Sr. | ....... | F16L 55/124 138/93 |
| 5,884,510 A * | 3/1999 | Crocco | ................... | E05B 67/36 70/38 A |
| 6,375,284 B1 * | 4/2002 | Frank | ...................... | A47F 3/005 312/257.1 |
| 6,419,104 B1 * | 7/2002 | Sarajian | .................. | B05B 12/26 215/361 |
| 6,883,546 B1 * | 4/2005 | Kobylinski | ......... | F16L 55/1141 215/273 |
| 8,381,467 B2 * | 2/2013 | Preiss | ................... | E04B 2/7422 52/282.1 |
| 8,596,941 B2 * | 12/2013 | Marlow | ............... | B60Q 1/2634 292/257 |
| 8,651,303 B1 * | 2/2014 | Groot | ..................... | B65D 55/14 70/171 |
| 8,899,272 B2 * | 12/2014 | Atkins | ...................... | E03F 3/04 138/44 |
| 10,076,691 B1 * | 9/2018 | Kingston | ............... | A63B 53/04 |
| 2007/0131643 A1 * | 6/2007 | Liao | ........................ | B65D 39/12 215/358 |
| 2008/0022732 A1 * | 1/2008 | McCarthy | .......... | B60K 15/0409 70/167 |
| 2014/0178146 A1 * | 6/2014 | Ma | ......................... | F16B 7/0413 411/80 |
| 2016/0018042 A1 * | 1/2016 | Bair | .................... | F16L 55/1141 138/89 |
| 2016/0177996 A1 * | 6/2016 | Elduayen Madariaga | ................. | E04G 17/007 220/234 |

(Continued)

*Primary Examiner* — Gary W Estremsky
(74) *Attorney, Agent, or Firm* — Leber IP Law; Celia H. Leber

(57) ABSTRACT

A removable plug is disclosed for concealing a bore in a piece of furniture, the plug includes a body configured to fit within the bore. A retaining portion of the body is configured to be of adjustable diameter such that a user can cause an increase in the diameter of the portion to create an interference fit between an outer wall of the body and an inner wall of the bore, thereby retaining the plug removably within the bore. Systems and methods that utilize the removable plug are also disclosed.

18 Claims, 10 Drawing Sheets

(56) References Cited

U.S. PATENT DOCUMENTS

| | | | |
|---|---|---|---|
| 2016/0195121 A1* | 7/2016 | O'Brien | F16B 2/14 |
| | | | 403/296 |
| 2017/0089381 A1* | 3/2017 | Klemm | F16B 43/009 |
| 2017/0284110 A1* | 10/2017 | Elduayen Madariaga | ............ |
| | | | E04G 17/0644 |
| 2017/0291743 A1* | 10/2017 | Kobylinski | F16L 55/1141 |
| 2020/0072269 A1* | 3/2020 | Rovoletto | F16B 12/2036 |

* cited by examiner

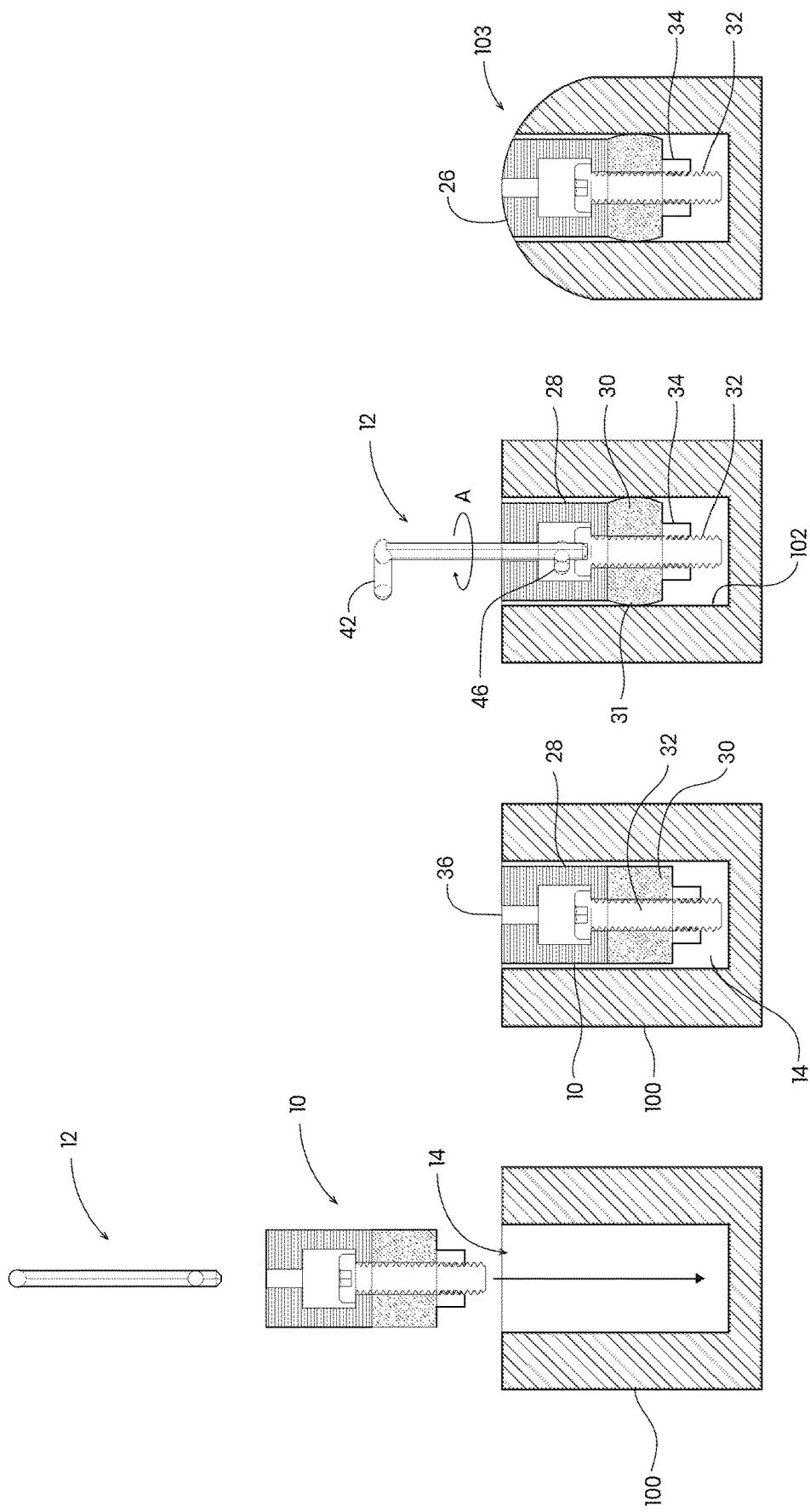

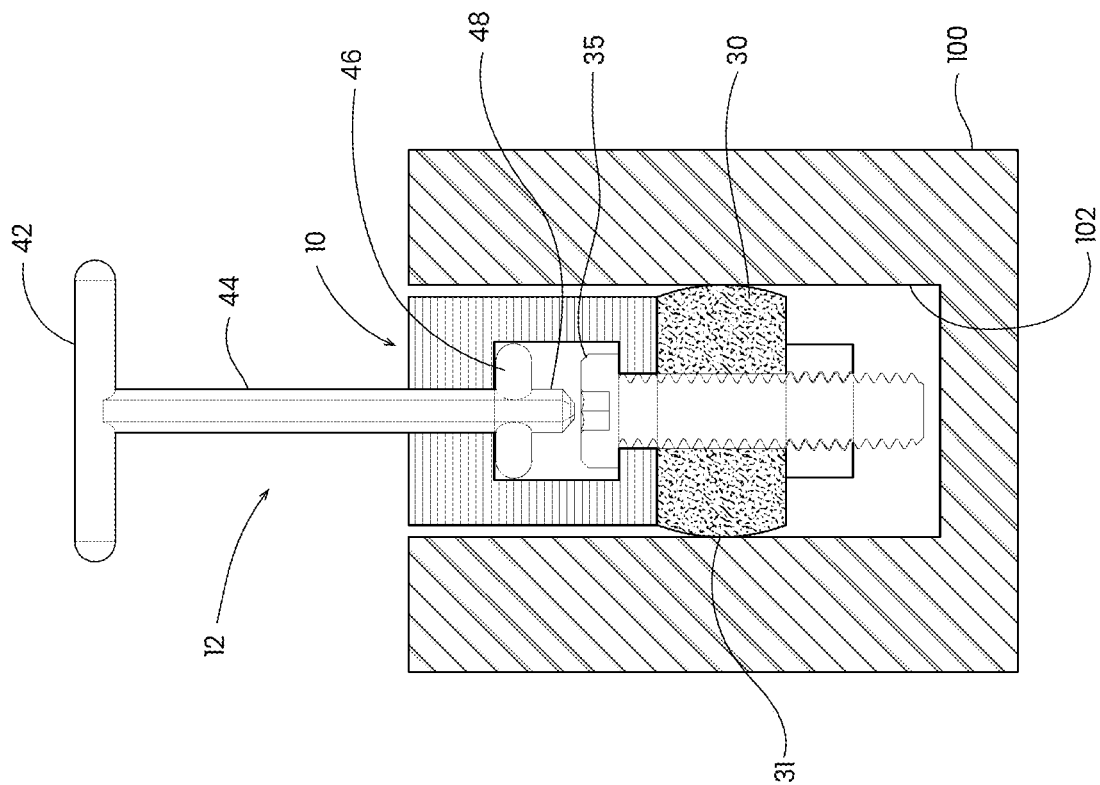
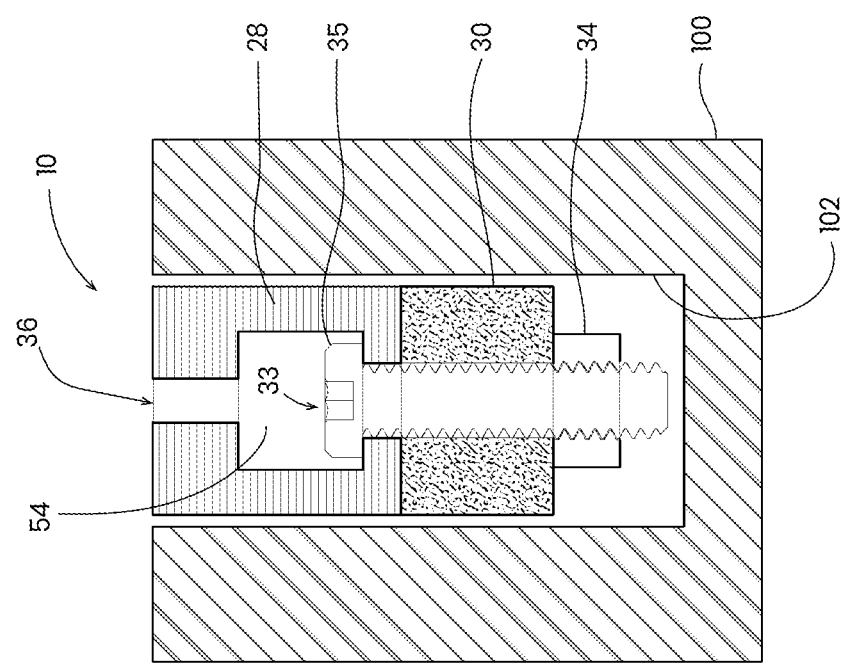
FIG. 10B
FIG. 10A

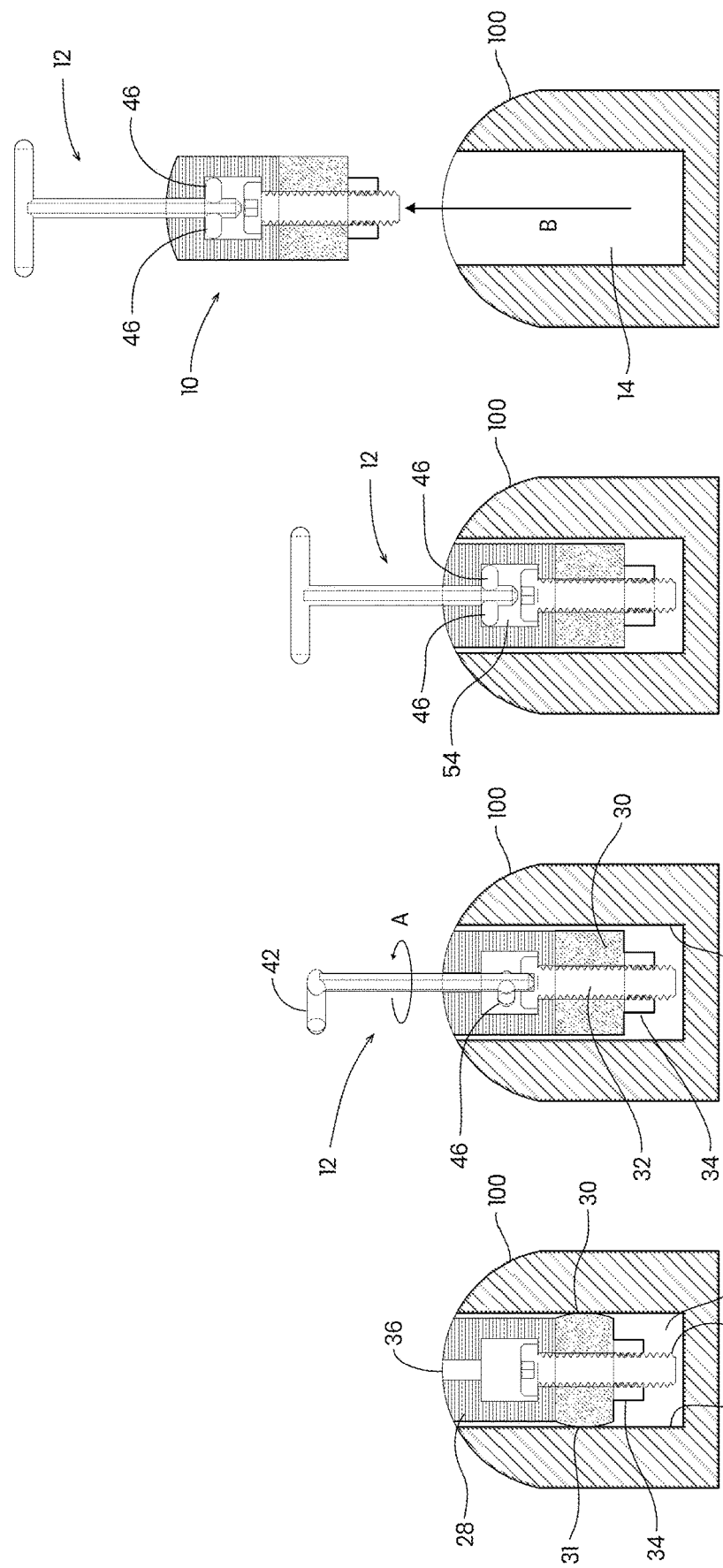

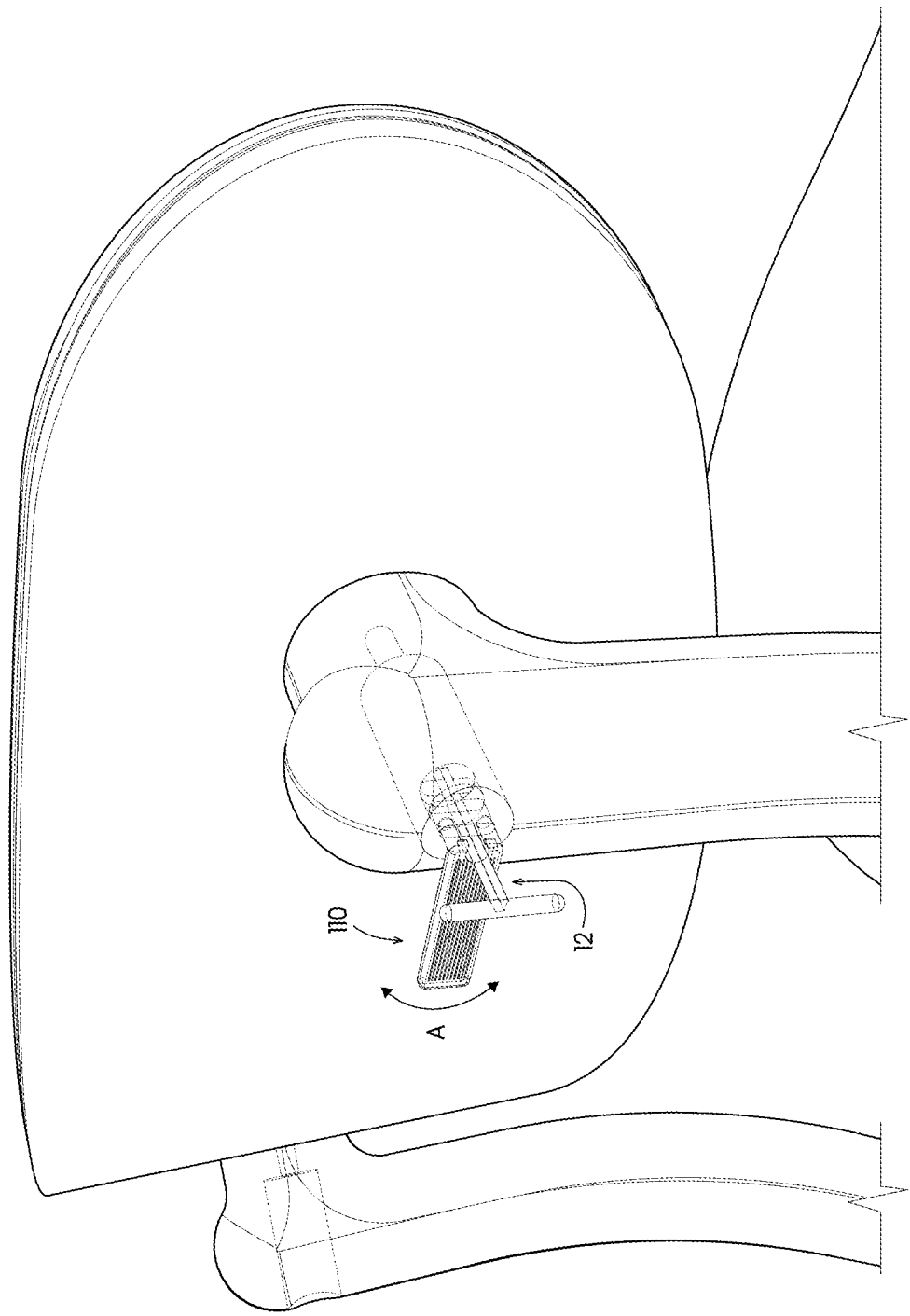

REMOVABLE PLUGS FOR FURNITURE, SYSTEMS INCLUDING SUCH PLUGS, AND METHODS OF THEIR USE

BACKGROUND

Many pieces of furniture, and in particular furniture constructed of wood, include multiple parts, for example legs, seat and back in a chair, which are held together by fasteners such as screws and bolts. Often these fasteners are countersunk (recessed below the surface), leaving an open bore in the furniture. In some pieces of furniture, such as inexpensive furniture or furniture with an industrial look, the fasteners are not concealed and the bore, if present, is open.

However, in most fine furniture there is a desire for a smooth, aesthetic wood surface and thus a need to conceal both the void from countersinking of the fastener and the fastener itself. In fine furniture this is generally accomplished by forming a cut plug (generally cylindrical) of the same material as the furniture and gluing the plug in place in the bore. The concealed fastener is thus permanently covered by a solid plug that is glued in place. If there is a need to take the furniture apart for any reason (e.g., for repair or reupholstering of a portion of the piece), it is necessary to drill out the plug and then try to match the species, grain, and finish of the piece with a new plug that is glued in during reassembly.

In flat pack furniture, i.e., furniture that is packed flat for shipping and generally assembled by the purchaser, plastic plugs are often used to cover the fasteners. In this case, in addition to the material of the plug not matching that of the piece, the head of the plug is not shaped to conform to the surface of the piece, particularly if the surface has an amorphic geometry, and cannot be formed by the user.

SUMMARY

The present disclosure pertains to removable plugs for furniture, systems including such plugs, and methods of their use. The plugs can be easily inserted into and removed from a countersink bore in a piece of furniture using only one or two simple tool(s), allowing the piece to be easily repaired or reupholstered. The plugs also allow fine furniture to be disassembled, e.g., for shipping or storage, and fasteners to be concealed in less expensive flat pack furniture in an aesthetic manner.

In some implementations, the visible portion of the plug is formed of the same material as the portion of the piece of furniture to which it is applied. In some cases, the visible surface of the plug is formable to a desired non-planar shape. In such cases, the surface may be formed by the furniture maker in situ (in position in the bore) during building of the piece, for example when an amorphic geometry is needed to match the curvature of the surrounding area. Alternatively, the plug may be mass produced and the plug surface formed to a desired shape during manufacturing of the plug.

In one aspect, the disclosure features a removable plug for concealing a bore in a piece of furniture. The plug includes a body configured to fit within the bore. A retaining portion of the body is configured to be of adjustable diameter such that a user can cause an increase in the diameter of the portion to create an interference fit between the outer wall of the body and the inner wall of the bore, thereby retaining the plug removably within the bore.

Some implementations of the plug include one or more of the following features. The body, or a portion of the body, may be generally cylindrical. The body may include a rigid portion having an upper surface that is visible when the plug is in the bore, and an elastomeric portion which forms the retaining portion. The plug may further include a pair of elements configured to be utilized by the user to apply a compressive force to the elastomeric portion that causes the increase in diameter of the retaining portion, for example a threaded fastener and a nut. The elastomeric portion may be positioned between the rigid portion and the nut. The rigid portion may include an opening in its upper surface, the opening being configured to receive an installation tool, and an internal cavity in communication with the opening within which the tool can rotate. The opening may be an oblong opening, and the internal cavity may have a diameter greater than a width of the oblong opening The rigid portion may further include a generally T-shaped opening in a side wall of the rigid portion, the generally T-shaped opening being configured to receive and support a head of the threaded fastener.

In another aspect, the disclosure features a plug for concealing a countersink bore in a piece of furniture, the plug including (a) a rigid portion having a surface that is visible when the plug is in the bore, an internal cavity, and an opening, in communication with the cavity, configured to receive a distal end of an installation tool, (b) an elastomeric portion disposed coaxially with the rigid portion and having a central bore, (c) a threaded fastener having a head disposed in the cavity and a shaft extending through the central bore to a distal end, and (d) a nut threaded onto the distal end of the fastener such that the elastomeric portion is positioned between the rigid portion and the nut.

Some implementations include one or more of the following features. The rigid portion may be formed of wood. The elastomeric portion may be generally cylindrical. The head of the threaded fastener may have a hexagonal opening configured to receive a hex wrench. A lower surface of the head may abut a bottom wall of the cavity such that tightening of the threaded fastener into the nut compresses the elastomeric portion between the rigid portion and the nut. The opening may be generally oblong. The internal cavity may have a diameter greater than a width of the oblong opening.

In a further aspect, the disclosure features a system for concealing a bore in a piece of furniture, the system comprising: (a) a plug comprising: a body configured to fit within the bore, wherein a retaining portion of the body is configured to be of adjustable diameter such that a user can cause an increase in the diameter of the portion to create an interference fit between the outer wall of the body and the inner wall of the bore, thereby retaining the plug removably within the bore; and (b) an installation tool configured to allow a user to adjust the diameter of the retaining portion.

Some implementations of the system include one or more of the following features. Adjustment may be performed by tightening a threaded fastener into a nut, and a distal end of the installation tool may be configured to engage a head of the threaded fastener. The plug may include a rigid portion having an upper surface that is visible when the plug is in the bore, an opening in the upper surface that is configured to receive the installation tool, and an internal cavity in communication with the opening within which the tool can rotate. The installation tool may further include a keyed portion configured to fit through the opening when aligned therewith, and, when the installation tool is rotated to move the keyed portion out of the aligned position, to hold the installation tool within the cavity. The system may further include an alignment tool configured to maintain the opening of the rigid portion in a predetermined position during installation of the plug into a piece of furniture. The alignment tool may include a portion configured to be grasped by a user, a portion configured to engage a shaft of the installation tool, and a portion that is configured to fit within the opening in the upper surface of the rigid portion.

In yet another aspect the disclosure features a method of concealing a bore in a piece of furniture. The method includes (a) placing within the bore a plug comprising a body configured to fit within the bore, wherein a retaining portion of the body is configured to be of adjustable diameter such that a user can cause an increase in the diameter of the portion to create an interference fit between the outer wall of the body and the inner wall of the bore, thereby retaining the plug removably within the bore; and (b) using an installation tool having a distal end configured to engage a portion of the plug to adjust the diameter of the retaining portion.

Some implementations of the method include one or more of the following features. Using the installation tool may include inserting the installation tool into an opening in the body, engaging the distal end with a head of a threaded fastener within the body, and rotating a handle of the installation tool to tighten the threaded fastener into a nut, compressing the retaining portion and thereby increasing its diameter. The method may further include shaping an exposed surface of the plug to form a non-planar shaped surface corresponding to a surrounding contoured surface of the piece of furniture. The method may further include using the installation tool to reduce the diameter of the retaining portion and to pull the plug out of the bore in the piece of furniture. The plug may include a rigid portion that has an upper surface and an opening in the upper surface, the opening being configured to receive the installation tool, and an internal cavity in communication with the opening within which the tool can rotate, and the method may further include using an alignment tool to maintain a predetermined orientation of the opening while the installation tool is rotated to adjust the diameter of the retaining portion. Maintaining the orientation may include inserting a first portion of the alignment tool into the opening and holding a second portion of the alignment tool in a predetermined position during rotation of the installation tool. The method may include shaping the exposed surface of the plug and the surrounding surface of the piece of furniture together, with the plug in place in the bore. The installation tool may further include a keyed portion configured to fit through the opening when aligned therewith, and the method may further include inserting the installation tool into the opening with the keyed portion in the aligned position and then rotating the installation tool so that the keyed portion is not in the aligned position.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DESCRIPTION OF THE DRAWINGS

FIGS. 9A-9D are a series of cross-sectional views showing steps in the insertion of the plug of FIG. 1 into a bore in a piece of furniture and subsequent shaping of the plug.

FIGS. 10A and 10B are enlarged views of FIGS. 9B and 9C, respectively, showing expansion of the elastomeric portion.

FIGS. 11A-11D are a series of cross-sectional views showing steps in the removal of the plug that was installed in FIGS. 9A-9D.

FIG. 13 is a perspective view similar to FIG. 1 showing the alignment tool of FIG. 12 in use during the installation.

DETAILED DESCRIPTION

Figure 1:
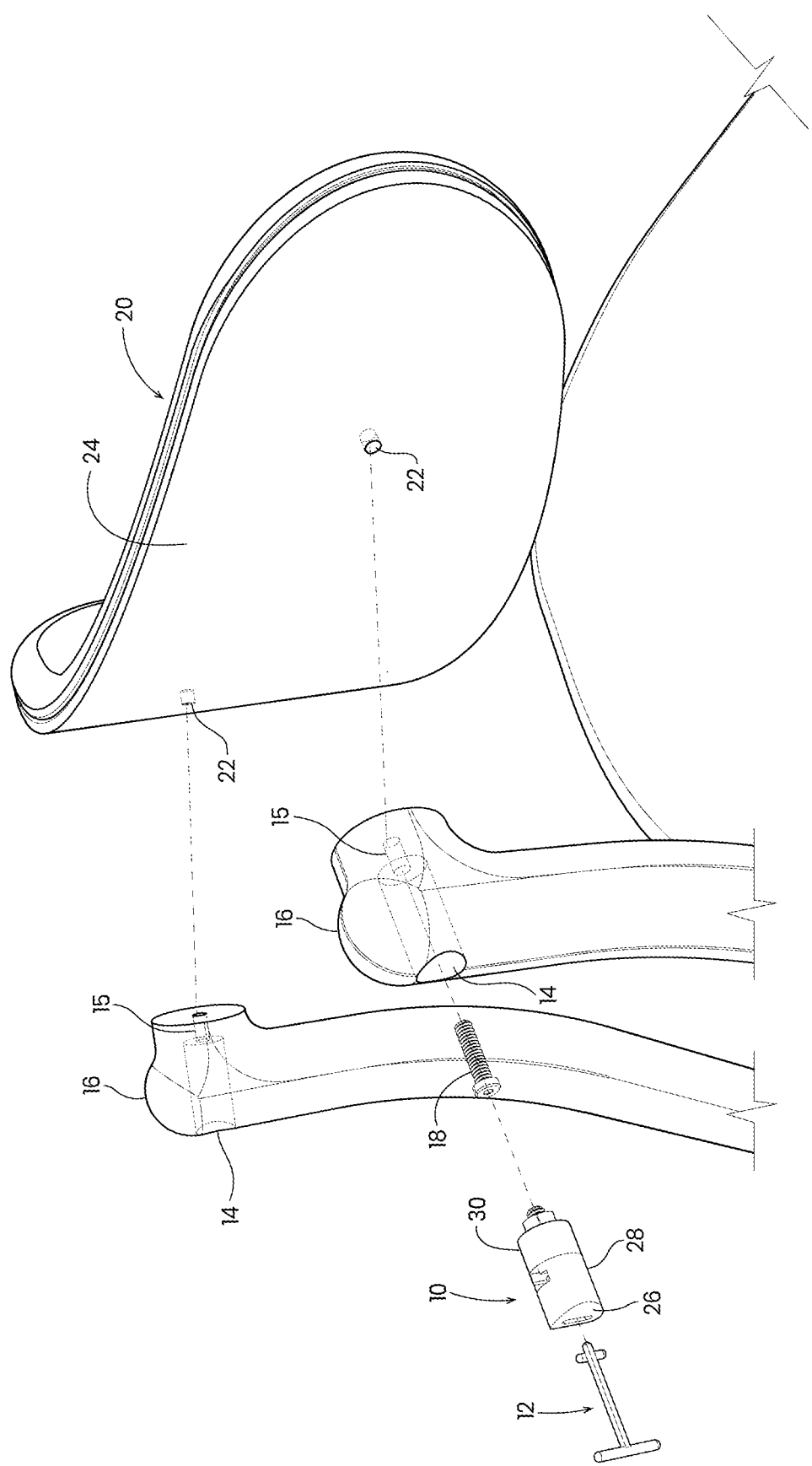
FIG. 1 is a perspective view showing a plug according to one implementation being installed in a piece of furniture.

As shown in FIG. 1, a plug 10 can be installed, using a tool 12, into a countersink bore 14 in a chair rail 16. The countersink bore 14 terminates in a smaller bore 15 that is configured to receive a threaded bolt 18. Threaded bolt 18 is used to secure a chair back 20 to the rail 16 by insertion of the bolt 18 into a corresponding threaded bore 22 in a curved plate member 24 of the chair back. The plug is releasably secured in place by expansion of an elastomeric portion 30, as will be discussed in detail below. Because the plug is releasably secured, it can be easily removed to allow removal of the chair back 20, which in turn allows the plate member 24 to be separated from the upholstery and the chair back 20 to be reupholstered. Alternatively, the entire chair back 20 could be replaced by a new chair back if the chair back 20 is worn or a different color or style of upholstery is desired.

Figure 1A:
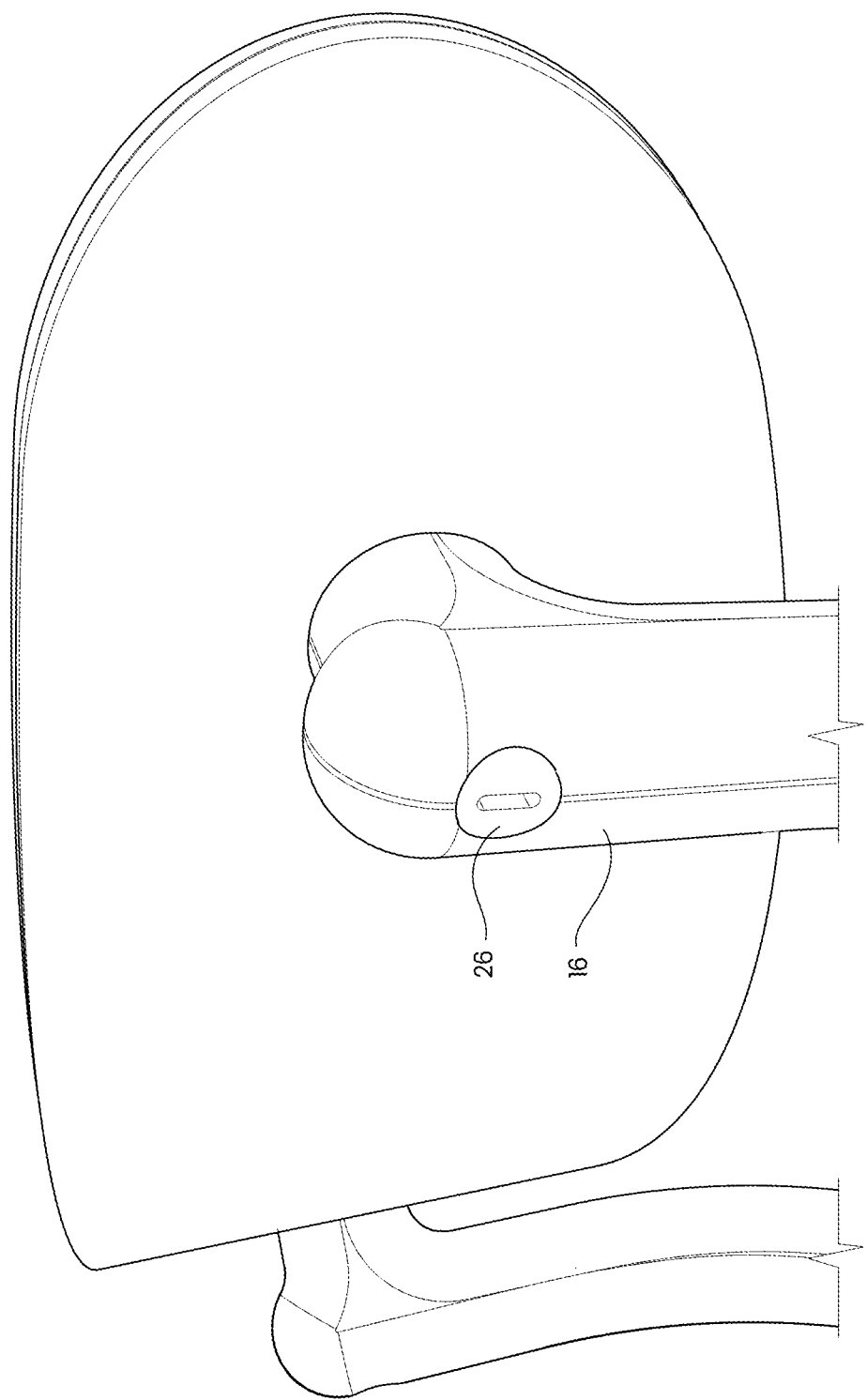
FIG. 1A is an enlarged detail view of a portion of FIG. 1 showing the exposed surface of the installed plug.

When installed, the plug 10 conceals the countersink bore 14 and thus also effectively conceals the head of bolt 18. The visible surface 26 of a rigid portion 28 of plug 10 is shaped to conform to the contour of the surrounding surface of the chair rail 16 as shown in FIG. 1A. The diameter of the rigid portion 28 at the visible surface 26 is substantially equal to that of the countersink bore, with only a very small clearance to allow insertion and removal, to substantially fill and conceal the opening of the countersink bore.

In some implementations, the rigid portion 28 of the plug is formed from the same material and has the same finish as the chair rail. Alternatively, if desired the rigid portion 28 could be formed of a contrasting material and/or have a contrasting finish.

Figure 4:
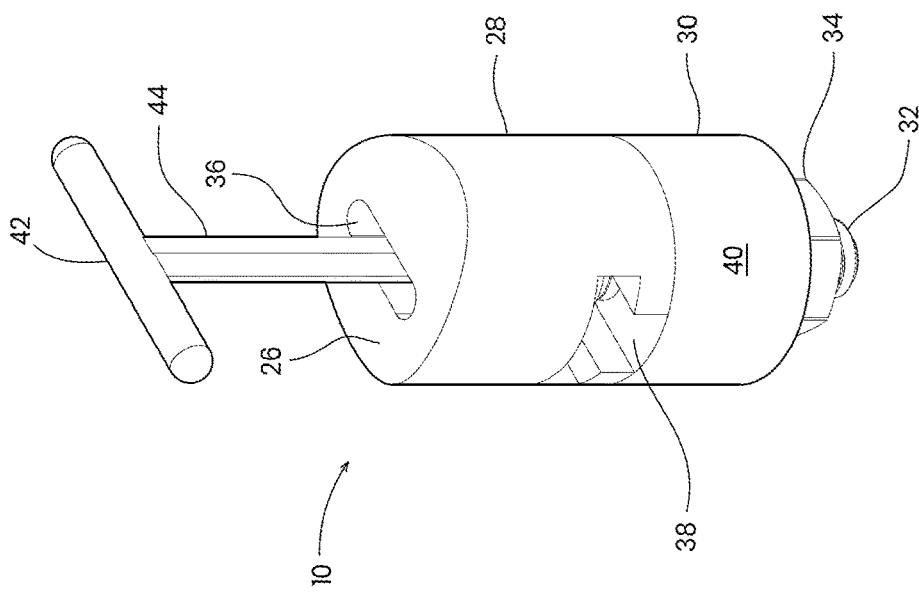
FIG. 4 is a perspective view showing the tool in place in the plug.
Figure 2:
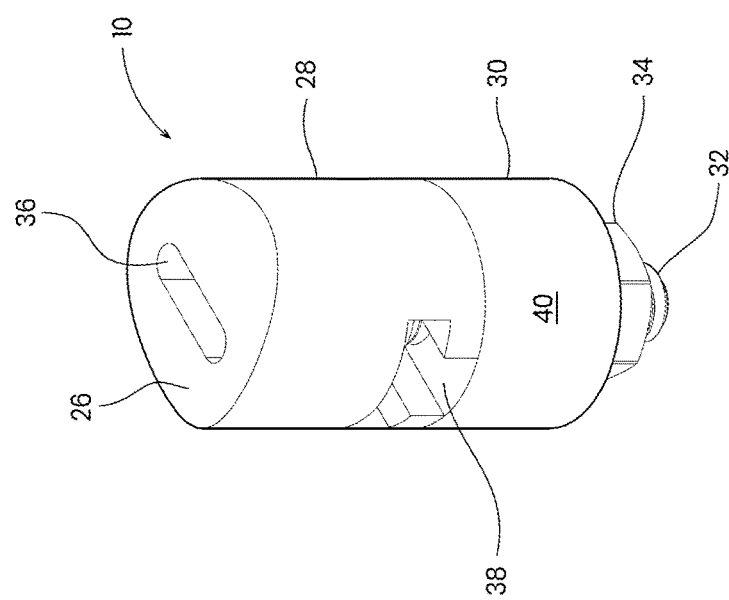
FIG. 2 is a perspective view of a plug according to one implementation.
Figure 6:
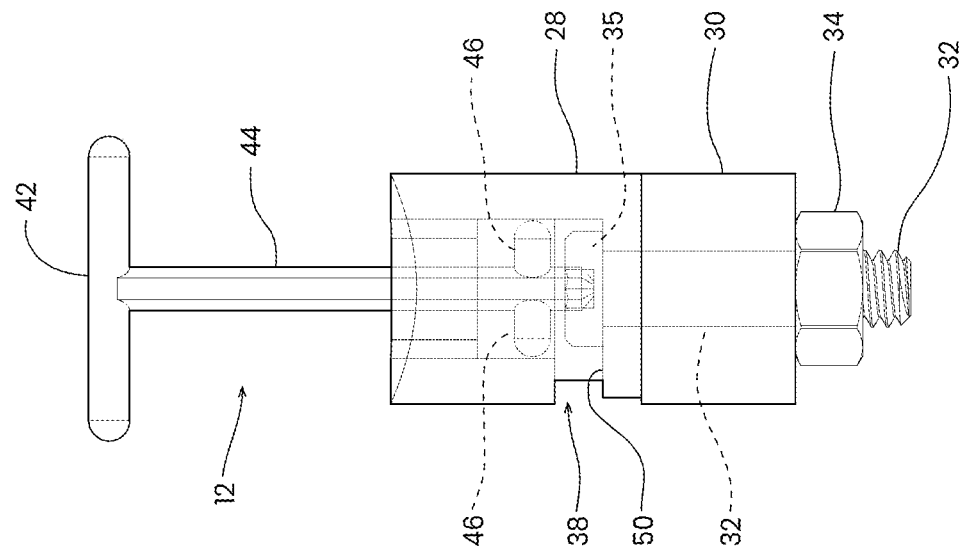
FIG. 6 is a front view of the plug with the tool in place showing engagement of the tool with the machine screw head.

Referring now to FIG. 2, the plug 10 includes, in addition to the rigid portion 28 and elastomeric portion 30, a machine screw 32 having a hex-shaped opening 33 in its head 35 (see FIG. 5) that extends through the interior of the plug 10, and a threaded nut 34 disposed at a distal end of the screw 32. The upper end of the rigid portion 28 includes an oblong through-opening 36 that is just large enough to receive pulling elements 46 adjacent a distal end of tool 12, as shown in FIGS. 4 and 6. The side surface of the rigid portion includes a generally T-shaped opening 38 configured to receive the head of machine screw 32 during assembly of the screw into the interior of plug 10.

The elastomeric element is formed of a material having sufficient resiliency to allow its side surface 40 to expand outward when the elastomeric portion is compressed, as will be discussed in further detail below.

Figure 3:
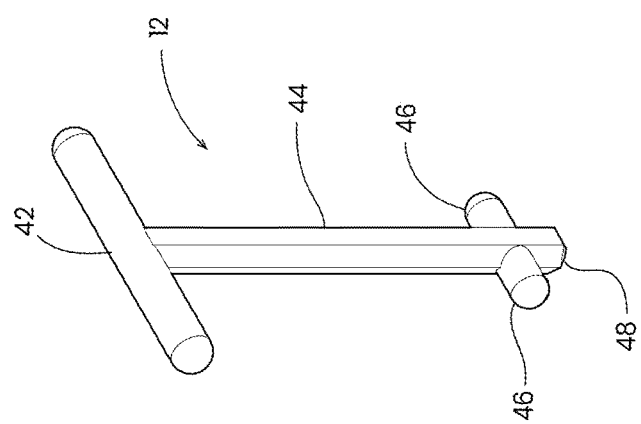
FIG. 3 is a perspective view of a plug installation/removal tool according to one implementation.

As shown in FIG. 3, the tool 12 includes a handle 42 configured to be grasped by a user, an elongated shaft 44, a pair of pulling elements 46 extending outwardly from the shaft generally perpendicular to the longitudinal axis of the shaft, and a hex-shaped distal end 48 having a size corresponding to that of the opening 33 in machine screw 32. If desired, the entire length of shaft 44 can be hex shaped as in the case of a hex wrench (also known as an Allen key).

Figure 5:
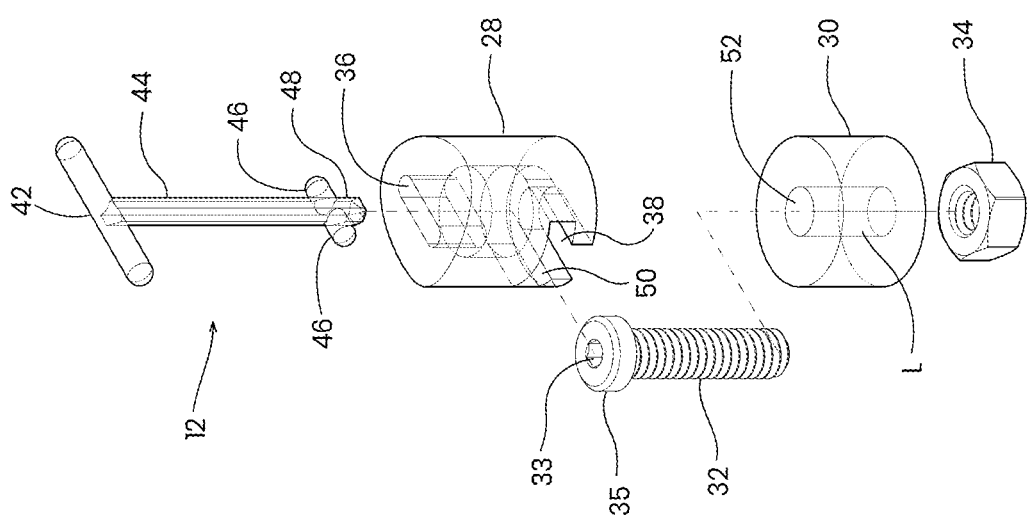
FIG. 5 is an exploded view of the plug with the tool shown to indicate its insertion position; dotted lines indicate how the machine screw is assembled into the plug.

Referring to FIG. 5, to assemble the plug 10 shown in FIG. 1 the head 35 of the machine screw 32 is inserted laterally into the T-shaped opening 38 as indicated by the upper dotted line. A lower surface of the head 35 is supported by a shelf surface 50 of the T-shaped opening, as can be seen, e.g., in FIG. 8. The machine screw 32 is then inserted into a bore 52 that extends along the longitudinal axis L of the elastomeric portion 30, and nut 34 is applied to the distal end of the machine screw and tightened sufficiently to maintain the upper surface of the elastomeric portion in contact with the lower surface of the rigid portion. In this initial, assembled state of the plug 10 the elastomeric portion 30 is held in place between the rigid portion and the nut, but not compressed to an extent that appreciably increases its diameter (or not compressed at all). Whether this is the case or whether the nut has been overtightened, compressing the elastomeric portion 30 to an extent that increases its diameter, can be determined by trying to insert the plug 10 into the countersink bore 14 (FIG. 1). If the elastomeric portion 30 is compressed too much it will be difficult or impossible to insert the plug, which can be remedied by loosening the machine screw.

Figure 8:
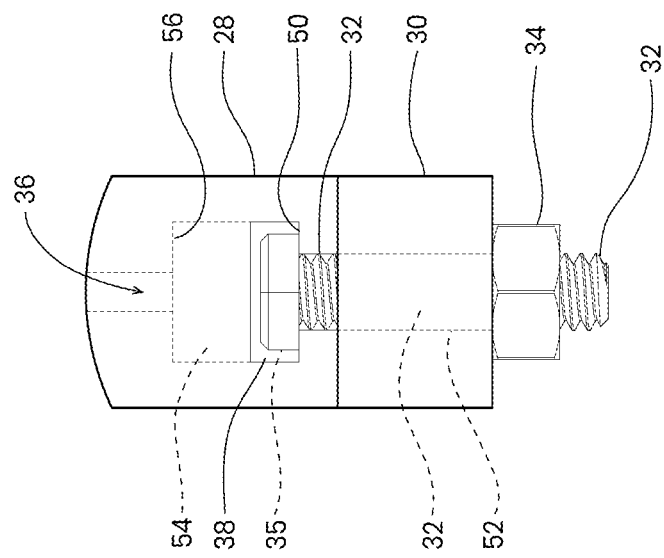
FIG. 8 is a side view of the plug with the tool removed and the inner structure of the plug shown in phantom lines.
Figure 7:
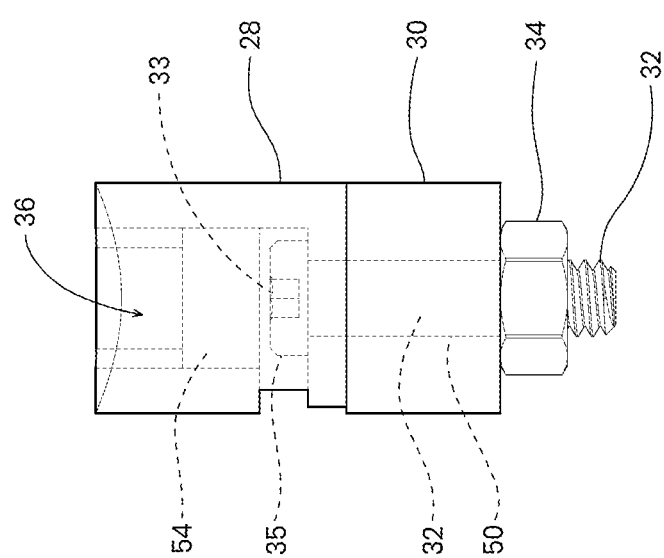
FIG. 7 is a front view of the plug with the tool removed and the inner structure of the plug shown in phantom lines.

As can be seen in FIGS. 7 and 8, the rigid portion 28 includes an inner cavity 54, in communication with the oblong opening 36, that has a sufficient diameter to allow the pulling elements 46 to be rotated within the cavity. Thus, when the user inserts the distal end of the tool 12 through the oblong opening 36, by aligning the pulling elements with the oblong opening, the tool can be locked in place within the cavity 54 by rotating it 90 degrees, such that the pulling elements are out of alignment with the opening and thus removal is prevented by contact between the ceiling 56 (FIG. 8) of the cavity 54 and the upper surface of the pulling elements 46. This arrangement facilitates removal of the plug 10 from the countersink bore, as will be discussed further below. The pulling elements 46 are also able to rotate freely within the cavity 54, allowing the shaft 44 of the tool 12 to be rotated to tighten or loosen the machine screw. To remove the tool from the plug the user simply realigns the pulling elements with the opening.

The steps for installation and shaping of the plug 10 are shown in FIGS. 9A-9D, with steps 9B and 9C being shown in more detail in FIGS. 10A and 10B, respectively.

As shown in FIGS. 9A and 9B, the assembled plug 10, with the elastomeric portion in its uncompressed state, is first placed in the countersink bore 14 in the piece of furniture 100. (It is noted that, for the sake of simplicity the smaller bore 15 and fastener 18 of FIG. 1 are omitted here.) The tool 12 is then inserted into oblong opening 36 by aligning the pulling elements with the opening. The user engages the hex-shaped distal end of tool 12 with the hex shaped opening 33 in the head 35 of the machine screw 32 and turns the handle 42 in the direction of arrow A to tighten the screw into the nut 34. This compresses the elastomeric portion 30 between the lower surface of the rigid portion 28 and the upper surface of the nut 34, causing the circumferential wall of the elastomeric portion to bow outward, as shown in FIG. 9C. The resulting interference fit between the bowed out surface 31 of the elastomeric portion 30 and the inner wall 102 (FIG. 10B) of the bore 14 securely and releasably holds the plug 10 in place in the bore 14. The visible surface 26 of the plug 10 and a surrounding area of the piece of furniture 100 can then be shaped together, e.g., to form the non-planar, curved surface 103 shown in FIG. 9D, e.g., using a sander, rasp, or other suitable tool.

The process of removing the plug 10, for example to reupholster or repair the part of the piece of furniture that is secured by the concealed fastener, is shown in FIGS. 11A-11D. The initial state of the plug 10 within the bore 14 is shown in FIG. 11A, in which the bowed out surface 31 of the elastomeric portion 30 can be seen pressing against the inner wall 102 of the bore 14. The user first inserts the tool 12 through the oblong opening 36, as shown in FIG. 11B, and then engages the distal end of the tool in the hex shaped opening 33 of the head 35 of the machine screw 32. The user rotates the tool 12, as indicated by arrow A, using handle 42, to back the machine screw 32 out of the nut 34 and thus release the compressive force on the elastomeric portion 30. This in turn releases the pressure exerted by the elastomeric portion 30 on the inner wall 102 of the bore 14, restoring the clearance between the surfaces of the elastomeric portion 30 and the inner wall 102 as seen in FIG. 11B. Next, the user orients the pulling elements 46 of the tool so that they are not aligned with the oblong opening 36, as shown in FIG. 11C, thereby locking the distal end of the tool 12 in place in the cavity 54. The user can then easily withdraw the plug 10 from the bore 14 by pulling upward on the tool 12 (FIG. 11D), with the pulling elements 46 exerting a force in the direction of arrow B on the ceiling of the cavity 54. Once the plug has been removed the user can withdraw the tool 12 from the plug 10 by simply rotating the tool until the pulling elements 46 are aligned with the oblong opening 36.

While the rigid portion is generally made of wood, particularly when the piece of furniture is made of wood, other rigid materials may be used. If the rigid portion is to be shaped in situ, suitable materials will be capable of being shaped without damage to the surrounding area of the piece of furniture. If the plug is to be used in an application where shaping is not required, or in an application in which the visible surface of the plug can be pre-shaped, a wide range of materials may be used in addition to wood, including plastics, composites, and metals. The material can be selected to match the surrounding area of the piece of furniture or to contrast with or complement the surrounding area. For example, a plug having a walnut rigid portion could be used in a part of a piece of furniture made of maple to provide a decorative contrast.

The elastomeric portion may be made of any desired elastomeric material, including thermoplastic elastomers, natural rubber, silicone rubbers and mixtures thereof. The material is selected to allow the elastomeric portion to hold its shape while in its normal, uncompressed state, and deform sufficiently under compression to hold the plug securely in place. Suitable elastomeric materials also have sufficient elasticity to allow the elastomeric portion to return to its original state (providing sufficient clearance with the inner wall of the bore to allow removal of the plug) with minimal time delay (e.g., less than 5 seconds and preferably less than 1 second) after the compressive force is removed. In some implementations, the elastomeric material is a natural or synthetic rubber or a thermoplastic elastomer (TPE).

The plug 10 (or a plurality of the plugs) and the tool 12 can be supplied together as a kit or can be sold separately.

OTHER EMBODIMENTS

A number of embodiments have been described. Nevertheless, it will be understood that various modifications may be made without departing from the spirit and scope of the disclosure.

For example, while FIG. 9D depicts the upper surface of the plug being shaped in situ, within the countersink bore in the piece of furniture, in some implementations the shaping step may be omitted, e.g., if the upper surface has been pre-shaped or if the countersink bore is in a relatively planar surface. Moreover, while FIG. 9D shows a surrounding area of the piece of furniture being shaped at the same time as the upper surface of the plug, the curvature of the piece of furniture may already exist and the plug may be shaped to match the existing curvature.

Moreover, other types of screws and nuts may be used in place of the machine screw and hex nut shown in the drawings and described above. For example, the hex nut may be replaced by a tee nut (also referred to in the fastener art as a "T-nut"). As is well known, tee nuts include a threaded steel insert surrounded by a flange from which set-spikes protrude on one side. These spikes can be sunk into the facing surface of the elastomeric portion to hold the nut in place against the elastomeric portion and prevent the nut from spinning relative to the elastomeric portion. The tee nut also requires less clearance since the threaded insert portion of the tee nut can be dimensioned to be positioned inside the bore 52 of the elastomeric portion.

In some implementations, the separate elastomeric portion 30 and nut 34 can be replaced by a single, integral part. For example, elastomeric material can be overmolded onto a threaded receiver such that the receiver is embedded into the elastomeric element. This alternative embodiment has the advantage that it eliminates rotation of the threaded receiver (nut 34) relative to the elastomeric portion.

In addition, the machine screw (or other threaded fastener) can have a different type of head (for example Phillips) and the tool can have a correspondingly different type of distal end (in the example, a Phillips screwdriver tip.)

Further, if desired the rigid portion of the plug can have a non-cylindrical shape and the countersink bore can have a corresponding non-cylindrical shape. For example, the rigid portion can have a cross-sectional shape that is oval or any other desired shape, as long as the elastomeric portion, when expanded, is able to contact the inner wall of the countersink bore to a sufficient extent to hold the plug in place.

Figure 12:
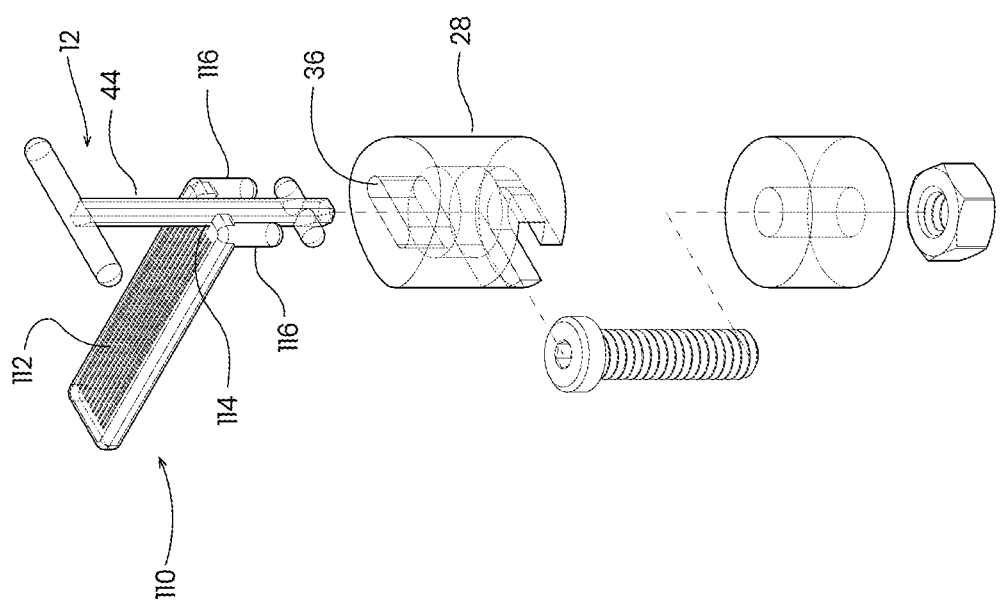
FIG. 12 is an exploded view of a plug and tool as shown in FIG. 5, with the addition of an alignment tool.

In some implementations, an alignment tool can be used to hold the plug in a predetermined orientation in the countersink bore during installation of the plug. This can be helpful because since the exposed surface of the plug is flush with the surface of the furniture it can be difficult to hold the rigid portion of the plug in a desired orientation during tightening. For example, referring to FIGS. 12 and 13, an alignment tool 110 includes a gripping portion 112, a groove 114 shaped to receive shaft 44 of the tool 12 with sufficient clearance to allow rotation of the shaft in the groove, and a pair of teeth 116 that extend generally perpendicular to the plane of the gripping portion 112. Teeth 114 are configured to fit into the oblong through-opening 36 on either side of the shaft 44. Thus, when the user holds the tool 110 during installation the engagement of the teeth 114 in the opening 36 allows the user to maintain a desired orientation of the through-opening 36 (e.g., to correspond to the orientation of the through-openings of other nearby plugs) by holding the gripping portion 112 in a fixed position while rotating the tool 12 as indicated by Arrow A in FIG. 13.

Accordingly, other embodiments are within the scope of the following claims.

What is claimed is:

1. A removable plug for concealing a bore in a piece of furniture, the plug comprising:
    a body configured to fit within the bore, the body including a rigid portion that includes an oblong opening in its upper surface, the opening being configured to receive an installation tool, and an internal cavity within the rigid portion, the cavity being in communication with the opening within which the tool can rotate, the internal cavity having a diameter greater than a width of the opening and having a ceiling that can be engaged by the tool to remove the plug from the bore;
    wherein a retaining portion of the body is configured to be of adjustable diameter such that a user can cause an increase in the diameter of the portion to create an interference fit between an outer wall of the body and an inner wall of the bore, thereby retaining the plug removably within the bore.

2. The removable plug of claim 1 wherein the rigid portion has an upper surface that is visible when the plug is in the bore, and the body further comprises an elastomeric portion which forms the retaining portion.

3. The removable plug of claim 2 further comprising a pair of elements configured to be utilized by the user to apply a compressive force to the elastomeric element that causes the increase in diameter of the retaining portion.

4. The removable plug of claim 3 wherein the pair of elements comprise a threaded fastener and a nut.

5. The removable plug of claim 4 wherein the rigid portion further includes a generally T-shaped opening in a side wall of the rigid portion, the generally T-shaped opening being configured to receive and support a head of the threaded fastener.

6. A system for concealing a bore in a piece of furniture, the system comprising:
    a plug comprising:
        a body configured to fit within the bore, the body including a rigid portion that includes an oblong opening in its upper surface, the opening being configured to receive an installation tool, and an internal cavity, within the rigid portion, the cavity being in communication with the opening within which the tool can rotate, the internal cavity having a diameter greater than a width of the opening and having a ceiling that can be engaged by the tool to remove the plug from the bore;
        wherein a retaining portion of the body is configured to be of adjustable diameter such that a user can cause an increase in the diameter of the portion to create an interference fit between an outer wall of the body and an inner wall of the bore, thereby retaining the plug removably within the bore; and
    an installation tool configured to allow a user to adjust the diameter of the retaining portion.

7. The system of claim 6 wherein adjustment is performed by tightening a threaded fastener into a nut, and a distal end of the installation tool is configured to engage a head of the threaded fastener.

8. The system of claim 7 wherein the rigid portion has a rigid surface that is visible when the plug is in the bore.

9. The system of claim 8 wherein the installation tool further comprises a keyed portion configured to fit through the opening when aligned therewith, and, when the installation tool is rotated to move the keyed portion out of the aligned position, to hold the installation tool within the cavity.

10. The system of claim 8 further comprising an alignment tool configured to maintain the opening of the rigid portion in a predetermined position during installation of the plug into a piece of furniture.

11. The system of claim 10 wherein the alignment tool includes a portion configured to be grasped by a user, a portion configured to engage a shaft of the installation tool, and a portion that is configured to fit within the opening in the upper surface of the rigid portion.

12. A method of concealing a bore in a piece of furniture, the method comprising:
placing within the bore a plug comprising:
a body configured to fit within the bore;
wherein a retaining portion of the body is configured to be of adjustable diameter such that a user can cause an increase in the diameter of the portion to create an interference fit between an outer wall of the body and an inner wall of the bore, thereby retaining the plug removably within the bore; and
using an installation tool having a distal end configured to engage a portion of the plug to adjust the diameter of the retaining portion; and
with the plug in place in the bore, shaping an exposed surface of the plug to form a non-planar shaped surface corresponding to a surrounding contoured surface of the piece of furniture.

13. The method of claim 12 wherein using the installation tool comprises inserting the installation tool into an opening in the body, engaging the distal end with a head of a threaded fastener within the body, and rotating a handle of the installation tool to tighten the threaded fastener into a nut, compressing the retaining portion and thereby increasing its diameter.

14. The method of claim 12 further comprising using the installation tool to reduce the diameter of the retaining portion and to pull the plug out of the bore in the piece of furniture.

15. The method of claim 12 wherein the plug includes a rigid portion that has an upper surface and an opening in the upper surface, the opening being configured to receive the installation tool, and an internal cavity in communication with the opening within which the tool can rotate, and the method further comprises using an alignment tool to maintain a predetermined orientation of the opening while the installation tool is rotated to adjust the diameter of the retaining portion.

16. The method of claim 15 wherein the installation tool further comprises a keyed portion configured to fit through the opening when aligned therewith, and the method further comprises inserting the installation tool into the opening with the keyed portion in the aligned position and then rotating the installation tool so that the keyed portion is not in the aligned position.

17. A removable plug for concealing a bore in a piece of furniture, the plug comprising:
a body configured to fit within the bore, the body comprising
a rigid portion having an upper surface that is visible when the plug is in the bore, the rigid portion having an oblong opening in its upper surface configured to receive an installation tool, and an internal cavity, within the rigid portion, the cavity being in communication with the opening within which the tool can rotate, the internal cavity having a diameter greater than a width of the opening and having a ceiling that can be engaged by the tool to remove the plug from the bore, and
a retaining portion comprising an elastomeric element; and
a pair of elements, comprising a threaded fastener and a nut, configured to be utilized by a user to apply a compressive force to the elastomeric element that causes an increase in diameter of the retaining portion;
wherein the retaining portion of the body is configured to be of adjustable diameter such that the user can cause an increase in the diameter of the retaining portion to create an interference fit between an outer wall of the body and an inner wall of the bore, thereby retaining the plug removably within the bore.

18. A method of concealing a bore in a piece of furniture, the method comprising:
providing within the bore a plug comprising:
a body configured to fit within the bore, the body including a rigid portion that includes an oblong opening in its upper surface, the opening being configured to receive an installation tool, and an internal cavity in communication with the opening within which the tool can rotate, the internal cavity having a diameter greater than a width of the opening;
wherein a retaining portion of the body is configured to be of adjustable diameter such that a user can cause an increase in the diameter of the portion to create an interference fit between an outer wall of the body and an inner wall of the bore, thereby retaining the plug removably within the bore;
inserting an installation tool having a distal end configured to engage a portion of the plug through the oblong opening by aligning the distal end with the oblong opening;
using the installation tool to adjust the diameter of the retaining portion; and
rotating the installation tool to a position in which the distal end is out of alignment with the oblong opening and using the installation tool to remove the plug from the bore by engaging the distal end with an upper wall of the cavity and pulling upward on the installation tool.

* * * * *